US011966028B2

United States Patent
Wang et al.

(10) Patent No.: US 11,966,028 B2
(45) Date of Patent: Apr. 23, 2024

(54) OPTICAL LENS, CAMERA MODULE AND FRONT CAMERA

(71) Applicant: JIANGXI LIANYI OPTICS CO., LTD, Nanchang (CN)

(72) Inventors: Yilong Wang, Nanchang (CN); Xuming Liu, Nanchang (CN); Haojie Zeng, Nanchang (CN); Jiyong Zeng, Nanchang (CN)

(73) Assignee: JIANGXI LIANYI OPTICS CO., LTD, Nanchang (CN)

( * ) Notice: Subject to any disclaimer, the term of this patent is extended or adjusted under 35 U.S.C. 154(b) by 577 days.

(21) Appl. No.: 17/198,294

(22) Filed: Mar. 11, 2021

(65) Prior Publication Data

US 2021/0199928 A1 Jul. 1, 2021

Related U.S. Application Data

(63) Continuation-in-part of application No. PCT/CN2020/122855, filed on Oct. 22, 2020.

(30) Foreign Application Priority Data

Nov. 12, 2019 (CN) .......................... 201911097437.0

(51) Int. Cl.
- *G02B 9/60* (2006.01)
- *G02B 13/00* (2006.01)
- *G02B 27/00* (2006.01)

(52) U.S. Cl.
CPC ........... *G02B 13/0045* (2013.01); *G02B 9/60* (2013.01); *G02B 27/0025* (2013.01)

(58) Field of Classification Search
CPC ........ G02B 13/0045; G02B 9/60; G02B 9/62; G02B 9/64; G02B 15/145113
See application file for complete search history.

(56) References Cited

U.S. PATENT DOCUMENTS

2013/0293756 A1 11/2013 Takuya

FOREIGN PATENT DOCUMENTS

| CN | 102736225 A | 10/2012 |
| CN | 102955223 A | 3/2013 |
| CN | 104898255 A | 9/2015 |

(Continued)

OTHER PUBLICATIONS

WIPO, International Search Report for PCT Application PCT/CN2020/122855, dated Jan. 20, 2021.

(Continued)

*Primary Examiner* — Christopher Stanford
*Assistant Examiner* — Journey F Sumlar

(57) ABSTRACT

Provided are an optical lens, a camera module and a front camera. From an object side to an Imaging plane, the optical lens sequentially includes: a stop; a first lens having a positive focal power and a concave object side surface; a second lens having a negative focal power and a concave image side surface; a third lens having a positive focal power, a convex object side surface and a concave image side surface; a fourth lens having a positive focal power, a concave object side surface and a convex image side surface; a fifth lens having a negative focal power. An entrance pupil diameter EPD of the optical lens is smaller than 1.58 mm, and the maximum distance between the projection of an entrance pupil and the projection of the object side surface of the first lens on the optical axis is greater than 0.17 mm.

20 Claims, 14 Drawing Sheets

(56) References Cited

FOREIGN PATENT DOCUMENTS

| | | | |
|---|---|---|---|
| CN | 104914558 | A | 9/2015 |
| CN | 106802470 | A | 6/2017 |
| CN | 108614347 | A | 10/2018 |
| CN | 108761741 | A | 11/2018 |
| CN | 209297018 | U | 8/2019 |
| CN | 110320641 | A | 10/2019 |
| CN | 110426813 | A | 11/2019 |
| JP | H09113806 | A | 5/1997 |

OTHER PUBLICATIONS

WIPO, Written opinion of the International Search Authority for PCT Application PCT/CN2020/122855, dated Jan. 20, 2021.
SIPO, First Office Action for CN Application No. 201911097437.0, dated Mar. 11, 2020.
SIPO, Notification to Grant Patent Right for Invention for CN Application No. 201911097437.0, dated Mar. 25, 2020.

OPTICAL LENS, CAMERA MODULE AND FRONT CAMERA

CROSS-REFERENCE TO RELATED APPLICATION

This disclosure is a continuation-in-part of a PCT Application No. PCT/CN2020/122855, filed on Oct. 22, 2020. The PCT application claims priority to a Chinese patent application No. 201911097437.0, filed on Nov. 12, 2019. The entirety of the above-mentioned applications is hereby incorporated by reference herein.

TECHNICAL FIELD

The present disclosure relates to the field of lens imaging technologies, and more particularly, to an optical lens, a camera module and a front camera.

BACKGROUND

Currently, with the popularization of portable electronic devices (for example, smart phones, tablets, and cameras), as well as the popularity of social, video, and live broadcast software, people have greater and greater passion for photography. Camera lens has become a standard configuration for the electronic devices, and has even become the primary consideration for consumers at the time of buying an electronic device.

With the continuous development of the mobile information technology, the portable electronic devices such as the mobile phones also develop towards a direction of ultra-thin body, full-screen, ultra-high-definition imaging, and the like. This puts forward higher requirements for the camera lens equipped on the portable electronic devices. In recent years, the consumers increasingly favor the mobile phones with a full screen, which mobile phones are searching for visual simplicity in addition to high resolution. However, "Notch" occurs in the mobile phones with a full screen, due to a large outer diameter of the head and a large overall volume of the existing camera lens. The notch occupies a large area, that is, a non-display area on the mobile phone screen is large. Thus, the screen-to-body ratio cannot be further increased.

SUMMARY

In view of the above, embodiments of the disclosure provide an optical lens, a camera module and a front camera.

The technical solutions provided by embodiments of the present disclosure are as follows.

In an embodiment of the present disclosure provides an optical lens. From an object side to an Imaging plane along an optical axis, the optical lens includes: a stop, a first lens, a second lens, a third lens, a fourth lens, and a fifth lens. The first lens has a positive focal power, an object side surface of the first lens is convex. The second lens has a negative focal power, an image side surface of the second lens is concave. The third lens has a positive focal power, an object side surface of the third lens is convex and an image side surface of the third lens is concave. The fourth lens has a positive focal power, an object side surface of the fourth lens is concave and an image side surface of the fourth lens is convex. The fifth lens has a negative focal power, a paraxial region of an object side surface of the fifth lens is concave, a paraxial region of an image side surface of the fifth lens is concave. An entrance pupil diameter EPD of the optical lens is smaller than 1.58 mm, and a distance of the projection of an entrance pupil and an edge of an effective optical portion of the object side surface of the first lens on the optical axis is greater than 0.17 mm.

In another embodiment of the present disclosure provides an imaging device, which may include an imaging element and the optical lens provided as mentioned above. The imaging element is configured to convert an optical image formed by the optical lens into an electrical signal.

In further another embodiment of the present disclosure, a camera module is provided, which may include the optical lens as mentioned above, a barrel, a holder, an image sensor, and a printed circuit board. The optical lens is received in the barrel, and the barrel is engaged with the holder. The image sensor is substantially accommodated in the holder and opposite to the optical lens. The image sensor is configured for converting light signals into electrical signals, thereby the images formed by the optical lens can be converted and transmitted to a processor.

In still another embodiment of the present disclosure, a front camera is provided, which may include the camera module as mentioned above, a processor, and a memory, wherein the camera module is configured to capture images, the processor is configured to process the captured images, and the memory is configured to store the captured images.

Figure 1A:
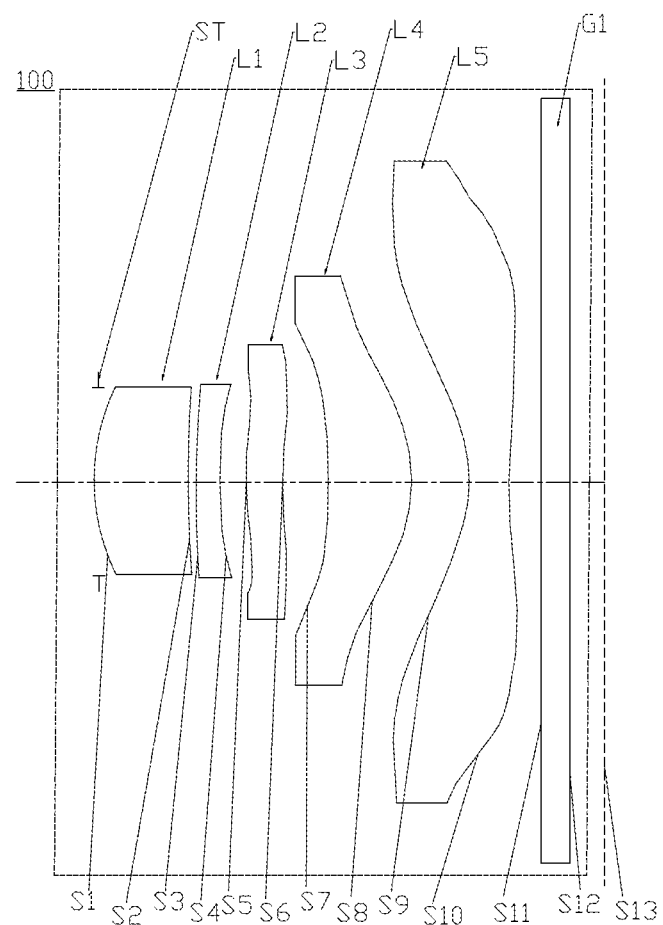
FIG. 1A is a schematic cross-sectional view of an optical lens according to a first embodiment of the present disclosure.

The following embodiments will further illustrate the present disclosure with reference to the above drawings.

DETAILED DESCRIPTION OF PREFERRED EMBODIMENTS

In order to facilitate the understanding of the present disclosure, embodiments of the present disclosure will be described more fully hereinafter with reference to the accompanying drawings. Several embodiments of the disclosure are presented in the drawings. However, the disclosure may be embodied in many different forms and is not limited to the embodiments described herein. Rather, these embodiments are provided only for the purpose of illustrating this disclosure more thoroughly and comprehensively.

Unless defined otherwise, all technical terms and scientific terms used herein have the same meaning as commonly understood by one of ordinary skill in the art to which this disclosure belongs. The terminologies used in the description of the disclosure are only for the purpose of describing specific embodiments, and are not intended to limit the disclosure.

Embodiments of the disclosure provides an optical lens. From an object side to an Imaging plane along an optical axis, the optical lens includes: a stop, a first lens, a second lens, a third lens, a fourth lens, and a fifth lens. The first lens has a positive focal power, an object side surface of the first lens is convex. The second lens has a negative focal power, an image side surface of the second lens is concave. The third lens has a positive focal power, an object side surface of the third lens is convex and an image side surface of the third lens is concave. The fourth lens has a positive focal power, an object side surface of the fourth lens is concave and an image side surface of the fourth lens is convex. The fifth lens has a negative focal power, a paraxial region of an object side surface of the fifth lens is concave, a paraxial region of an image side surface of the fifth lens is concave. An entrance pupil diameter EPD of the optical lens is smaller than 1.58 mm, and the maximum distance between the projection of an entrance pupil and the projection of the object side surface of the first lens on the optical axis is greater than 0.17 mm.

The common optical lens on the market, which are used in the mobile phones, generally has a minimum head outer diameter of ø3 mm. In contrast, due to the reasonable arrangement of the stop and the various lenses, the optical lens provided by the embodiments of the present disclosure has a small entrance pupil diameter, and a small head outer diameter of ø2 mm, satisfying the demand for a high screen-to-body ratio, and better satisfying the needs of the full screen of the mobile phones. Moreover, the optical lens may at least have advantages of for example a small outer diameter of the head, a small volume and high resolutions, satisfying the demand for a high screen-to-body ratio of the mobile phones.

Different from the related art, the optical lens provided by the embodiments of the present disclosure adopts five lenses with a specific refractive power, which lenses present a specific arrangement of the surface shapes and a reasonable distribution of focal power; as such a more compact structure of the optical lens is obtained while offering high resolution, thereby achieving compromise between miniaturization and the high resolution of the optical lens. Furthermore, a photographic field of a larger area can be obtained, which brings great convenience to the post-editing. In addition, the optical lens according to embodiments of the present disclosure enables the sense of depth and space for the imaged picture to be enhanced, providing better imaging quality.

In some embodiments, the optical lens may satisfy the following expression:

$$1.1 < TC1/ET1 < 1.6 \qquad (1)$$

where TC1 represents a center thickness of the first lens, and ET1 represents an edge thickness of the first lens. When the above expression (1) is satisfied, the depth of view of the optical system may decrease to about 0.95, which is conducive to reduction of the size of the head outer diameter of the optical lens. In particular, the head outer diameter of the optical lens may be minimized to ø2 mm. Thus, the needs of the full screen of the mobile phones can be better satisfied.

In some embodiments, the optical lens may satisfy the following expression:

$$0.5 < TC1/DM1 < 0.6 \qquad (2)$$

where TC1 represents a center thickness of the first lens, and DM1 represents a diameter of the first lens. When the above expression (2) is satisfied, the first lens may be enabled to have a larger positive focal power, which is conducive to the shortening of the total length of the optical lens and the miniaturization of the optical lens.

In some embodiments, the optical lens may satisfy the following expression:

$$0.7 < f1/f < 2.1 \qquad (3)$$

where f1 represents an effective focal length of the first lens, and f represents an effective focal length of the optical lens. When the above expression (3) is satisfied, the first lens may be enabled to have a larger positive focal power, which is conductive to the shortening of the total length of the optical lens.

In some embodiments, the optical lens may satisfy the following expression:

$$0.8 < f123/f < 1.4 \quad (4)$$

where f123 represents an effective focal length from the first lens to the third lens, and f represents an effective focal length of the optical lens. When the above expression (4) is satisfied, the focal power of the first lens, the optical focal power of the second lens and the optical focal power of the third lens can be reasonably assigned, to slow down the trend of deflection of light, reduce the correction of high-order aberrations, and thus reduce the difficulty of performing aberration correction on the overall optical lens.

In some embodiments, the optical lens may satisfy the following expression:

$$0.1 \text{ mm} < SAG11 - SAG12 < 0.3 \text{ mm} \quad (5)$$

where SAG11 represents a vector height of the object side surface of the first lens, and SAG12 represents a vector height of the image side surface of the first lens. When the above expression (5) is satisfied, the depth of view of the optical system can be effectively reduced; accordingly, the size of a window provided for the optical lens in the screen of the mobile phone may be reduced, and particularly down to 1.85 mm. This may effectively alleviate the technical problem in the related art that the size of the window provided for the optical lens in the screen of the mobile phone cannot be made smaller.

In some embodiments, the optical lens may satisfy the following expressions:

$$V1/(V2-V3) < -10 \quad (6)$$

$$V2 = 23.52 \quad (7)$$

where V1 represents an Abbe number of the first lens, V2 represents an Abbe number of the second lens, and V3 represents an Abbe number of the third lens. When the above expression (6) and (7) are satisfied, it is beneficial to improve the correction of chromatic aberration and the resolving power of the optical lens.

In some embodiments, the optical lens may satisfy the following expression:

$$0 < R31/R32 < 1 \quad (8)$$

where R31 represents a curvature radius of the object side surface of the third lens, and R32 represents the curvature radius of the image side surface of the third lens. When the above expression (8) is satisfied, the third lens is enabled to have a positive focal power and thus play a role in converging the light; in this way, the total length of the system may be reduced, and the miniaturization of the system may be facilitated.

In some embodiments, the optical lens may satisfy the following expression:

$$1.2 < R31/DM31 < 2.6 \quad (9)$$

where R31 represents a curvature radius of the object side surface of the third lens, and DM31 represents a diameter of the object side surface of the third lens. When the above expression (9) is satisfied, it is beneficial for the moulding of the optical lens with a high yield.

In some embodiments, the optical lens may satisfy the following expression:

$$0.1 < R11/R12 < 0.6 \quad (10)$$

where R11 represents a curvature radius of the object side surface of the first lens, and R12 represents a curvature radius of the image side surface of the first lens. When the above expression (10) is satisfied, the effective diameter of the first lens may be reduced, and thus the size of the head may be reduced.

In some embodiments, the first lens, the second lens, the third lens, the fourth lens and the fifth lens are all plastic aspherical lenses. That is, each lens adopts an aspherical lens. The aspherical lens may provide at least the following three advantages: 1, a better imaging quality of the optical system: 2, a more compact structure of the optical lens; and 3, a smaller total optical length of the optical lens.

The surface shapes of the various plastic aspherical lenses in the embodiments of the disclosure all satisfy the following equation:

$$z = \frac{ch^2}{1+\sqrt{1-(1+K)c^2h^2}} + \sum A_{2i}h^{2i}$$

where z represents a vector height of a distance from the apex of an aspheric surface to a position of the aspherical surface where the height is h along the optical axis, c represents a paraxial curvature of the surface, K is a quadratic surface coefficient, and $A_{2i}$ is a 2i-th order aspheric profile coefficient.

In the following embodiments, the thickness, the curvature radius, and the material of the lens in the optical lens may be selected to have some differences among different lenses. Details may be referred to parameter tables provided in the following embodiments.

Embodiment 1

Referring to FIG. 1A, a schematic cross-sectional view of an optical lens 100 provided in a first embodiment of the disclosure is illustrated. From an object side to an imaging surface along an optical axis, the optical lens may sequentially include a stop ST, a first lens L1, a second lens L2, a third lens L3, a fourth lens L4, a fifth lens L5, and an infrared filter G1.

The first lens L1 may be a plastic aspheric lens with a positive focal power, where an object side surface S1 of the first lens L1 may be a convex surface, and an image side surface S2 of the first lens L1 may be a concave surface.

The second lens L2 may be a plastic aspheric lens with a negative focal power, where an object side surface S3 of the second lens L2 may be a convex surface, and an image side surface S4 of the second lens L2 may be a concave surface.

The third lens L3 may be a plastic aspheric lens with a positive focal power, where an object side surface S5 of the third lens may be a convex surface, and an image side surface S6 of the third lens L3 may be a concave surface.

The fourth lens L4 may be a plastic aspheric lens with a positive focal power, where an object side surface S7 of the fourth lens IA may be a concave surface, and an image side surface S8 of the fourth lens L4 may be a convex surface.

The fifth lens L5 may be a plastic aspheric lens with a negative focal power, where an object side surface S9 of the fifth lens L5 may be configured to be concave at a position adjacent to the optical axis, and an image side surface S10 of the fifth lens L5 may be configured to be concave at a position adjacent to the optical axis.

Figure 1B:
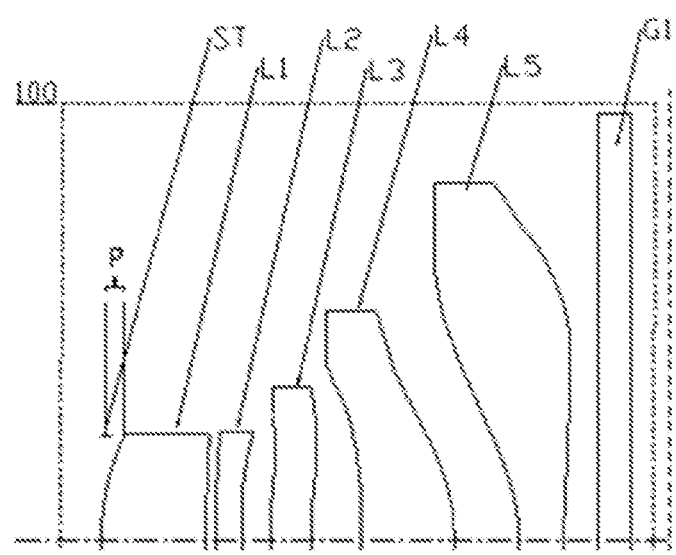
FIG. 1B illustrates a distance P between an entrance pupil and an object side surface of a first lens included in the optical lens of the first embodiment.

In this embodiment, an entrance pupil diameter EPD of the optical lens 100 may be smaller than 1.58 mm, and the maximum distance between the projection of an entrance pupil EP and the projection of the object side surface S1 of the first lens L1 on the optical axis is greater than 0.17 mm. The maximum distance P between the projections is illustrated in FIG. 1B.

In some embodiments, the first lens L1, the second lens L2, the third lens L3, the fourth lens IA and the fifth lens L5 may all be glass lenses, or may also be a combination of plastic lenses and glass lenses. The distance between the first lens L1 and the second lens L2 is smaller than the distance between any two adjacent lenses of the second lens L2, the third lens L3, the fourth lens L4 and the fifth lens L5. The thickness of the fifth lens L5 at a position adjacent to the optical axis is smaller than the edge thickness of the fifth lens L5.

TABLE 1

| Surface No. | | Curvature radius(mm) | Thickness (mm) | Refractive index | Abbe number |
|---|---|---|---|---|---|
| | Object plane | — | 350 | | |
| ST | the stop | — | −0.04 | | |
| S1 | the first lens L1 | 1.610065 | 0.86016 | 1.54 | 55.9 |
| S2 | | 8.377256 | 0.030181 | | |
| S3 | the second lens L2 | 10.27445 | 0.216748 | 1.67 | 19.2 |
| S4 | | 3.926787 | 0.256596 | | |
| S5 | the third lens L3 | 3.699464 | 0.317756 | 1.64 | 23.5 |
| S6 | | 4.177242 | 0.380121 | | |
| S7 | the fourth lens L4 | −7.83723 | 0.752174 | 1.54 | 55.9 |
| S8 | | −1.25456 | 0.505479 | | |
| S9 | the fifth lens L5 | −1.35843 | 0.370323 | 1.53 | 55.6 |
| S10 | | 5.572868 | 0.3 | | |
| S11 | the infrared filter | — | 0.21 | 1.51 | 64 |
| S12 | G1 | — | 0.338933 | | |
| | Imaging plane S13 | | | | |

The profile coefficients of the various aspheric surfaces of the optical lens 100 in this embodiment are shown in Table 2-1 and Table 2-2.

TABLE 2-1

| Surface No. | K | $A_4$ | $A_6$ | $A_8$ | $A_{10}$ |
|---|---|---|---|---|---|
| S1 | −0.39206 | −0.02109 | 0.136323 | −0.37381 | 0.236975 |
| S2 | −81.0571 | −0.14217 | 0.149877 | 0.033171 | −0.91181 |
| S3 | 0 | −0.1359 | 0.481958 | −1.04684 | 0.410585 |
| S4 | 6.204578 | −0.0273 | 0.20896 | −0.41393 | 0.709261 |
| S5 | 0.690906 | −0.17739 | 0.080799 | 0.2349 | −1.40717 |
| S6 | 0 | −0.16342 | 0.133151 | −0.18726 | 0.1456 |
| S7 | −6.35652 | −0.11724 | 0.100143 | −0.07307 | 0.007872 |
| S8 | −0.55694 | 0.055402 | 0.030638 | 0.002734 | −0.00167 |
| S9 | −0.74975 | 0.086011 | −0.00566 | 0.000209 | 6.94E−05 |
| S10 | 2.47542 | −0.05458 | 0.013861 | −0.00328 | 0.000357 |

TABLE 2-2

| Surface No. | $A_{12}$ | $A_{14}$ | $A_{16}$ | $A_{18}$ | $A_{20}$ |
|---|---|---|---|---|---|
| S1 | 1.496053 | −5.75625 | 9.948582 | −8.64525 | 3.023064 |
| S2 | −0.08491 | 4.208622 | 2.144105 | −13.1916 | 8.541888 |
| S3 | 1.376978 | 0.66312 | −2.21877 | 0.020723 | 0.768906 |
| S4 | −1.25275 | 0.233429 | 5.370508 | −9.89845 | 5.707015 |
| S5 | 2.853683 | −1.88136 | −2.19131 | 4.210459 | −1.95797 |
| S6 | −0.06085 | 0.096963 | −0.15236 | 0.100958 | −0.02411 |
| S7 | −0.00965 | 0.01347 | 0.008068 | −0.0088 | 0.001694 |
| S8 | 2.43E−05 | −0.0004 | −6.1E−05 | 0.000125 | −2.1E−05 |
| S9 | −8.5E−06 | −9.3E−07 | 4.59E−07 | −4.5E−08 | 1.76E−09 |
| S10 | −4.9E−06 | −2.5E−06 | −3.1E−07 | 1.43E−07 | −1E−08 |

Figure 2:
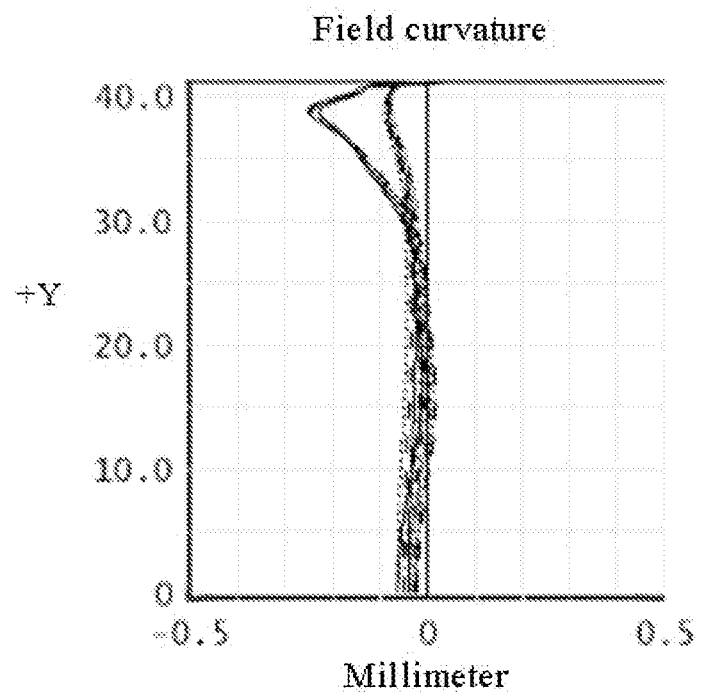
FIG. 2 is a diagram showing field curvature curves of the optical lens according to the first embodiment of the present disclosure.
Figure 3:
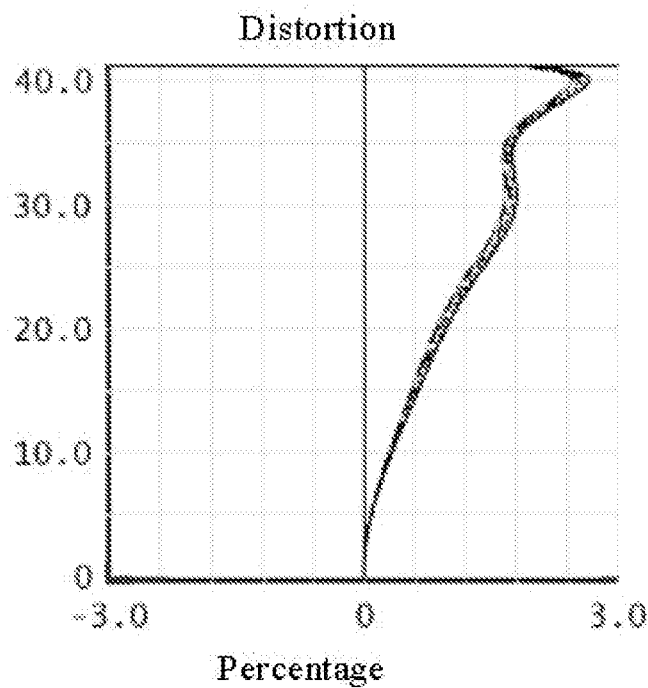
FIG. 3 is a diagram showing distortion curves of the optical lens according to the first embodiment of the present disclosure.
Figure 4:
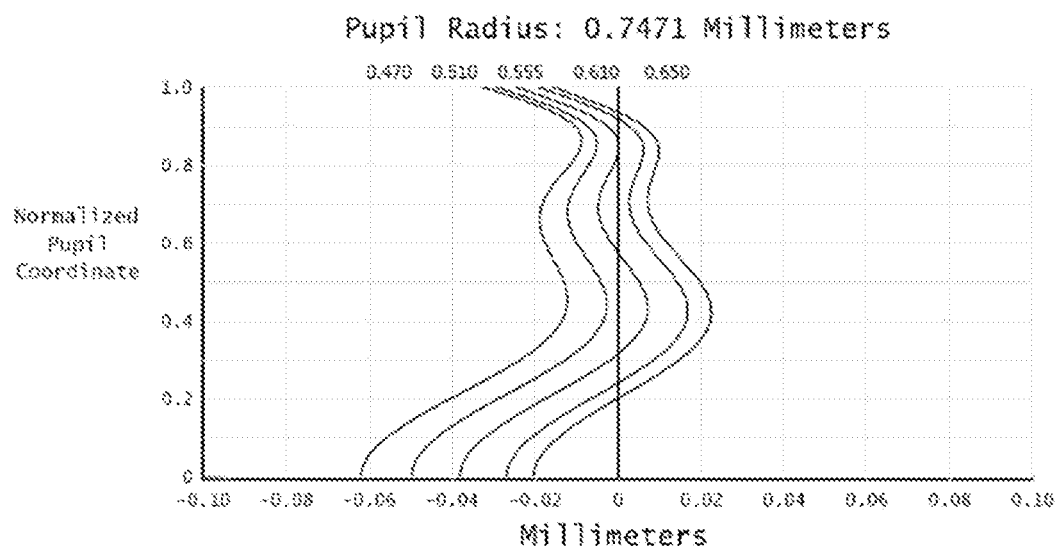
FIG. 4 is a diagram showing longitudinal aberration curves of the optical lens according to the first embodiment of the present disclosure.
Figure 5:
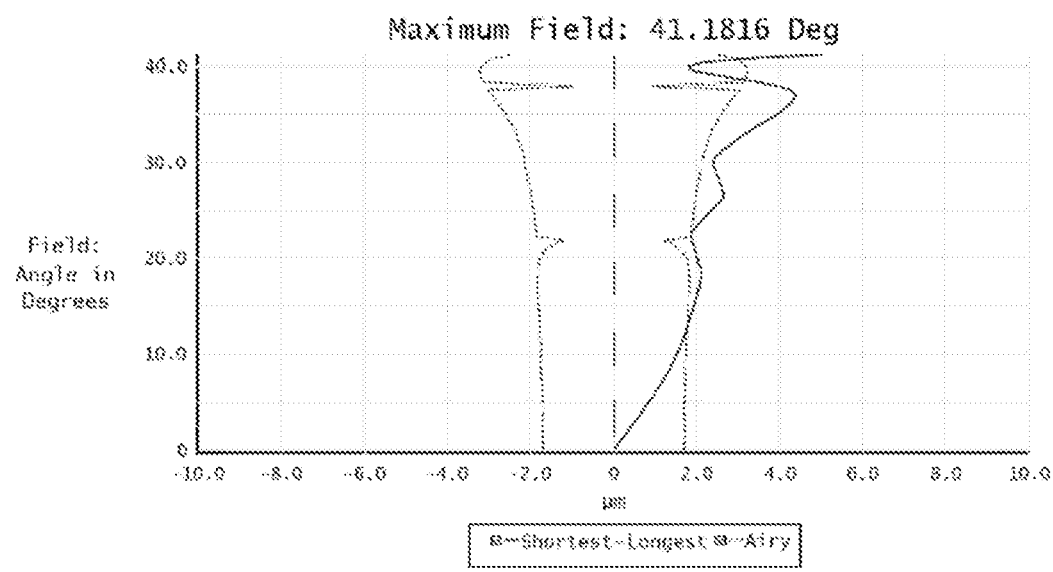
FIG. 5 is a diagram showing lateral chromatic aberration curves of the optical lens according to the first embodiment of the present disclosure.

In this embodiment, the field curvature curves, distortion curves, longitudinal aberration curves, and lateral chromatic aberration curves of the optical lens 100 are respectively shown in FIG. 2, FIG. 3. FIG. 4 and FIG. 5. As can be seen from FIG. 2 to FIG. 4, the field curvature, the distortion and the chromatic aberration can be well corrected in this embodiment.

Embodiment 2

Figure 6:
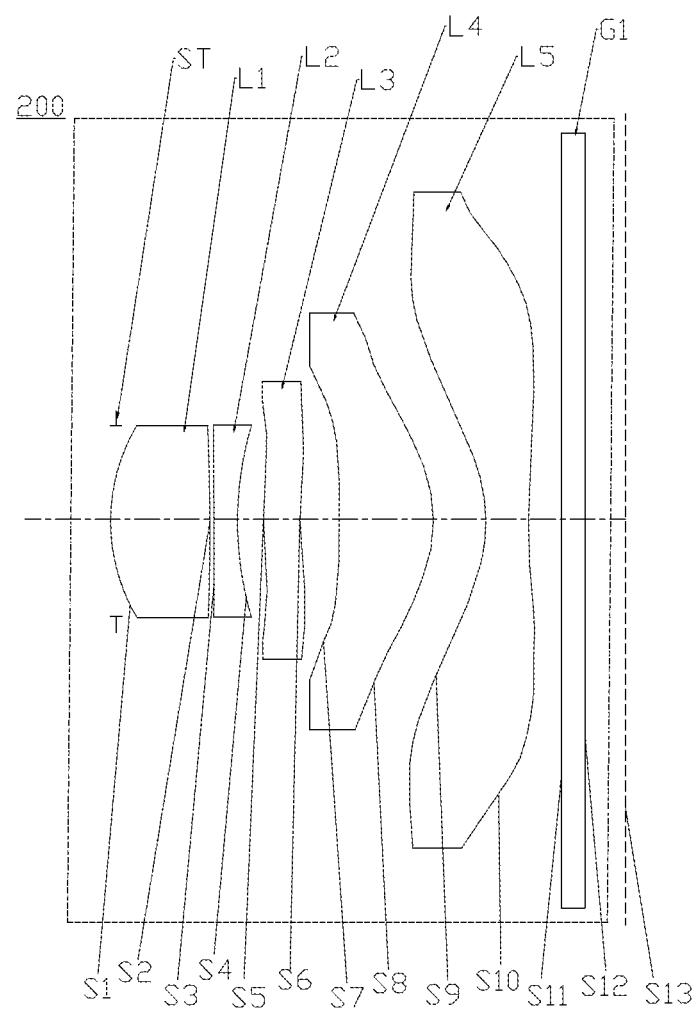
FIG. 6 is a schematic cross-sectional view of an optical lens according to a second embodiment of the present disclosure.
Figure 7:
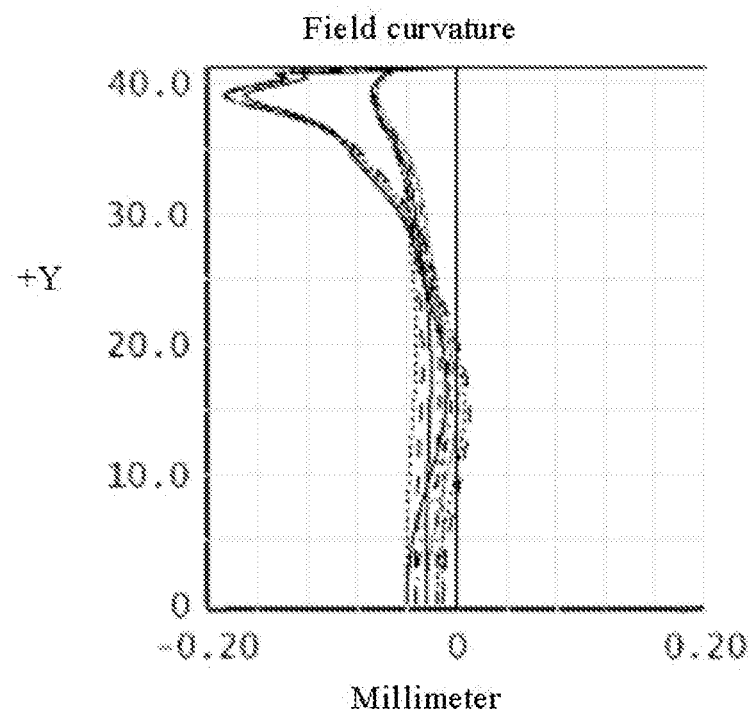
FIG. 7 is a diagram showing field curvature curves of the optical lens according to the second embodiment of the present disclosure.
Figure 8:
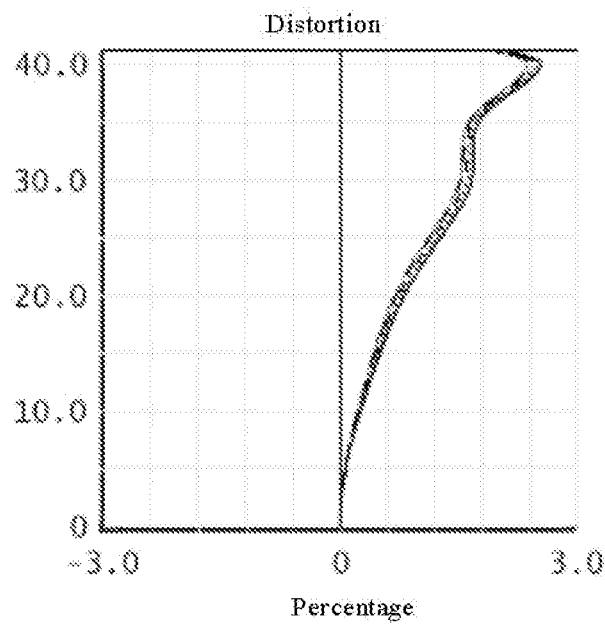
FIG. 8 is a diagram showing distortion curves of the optical lens according to the second embodiment of the present disclosure.
Figure 9:
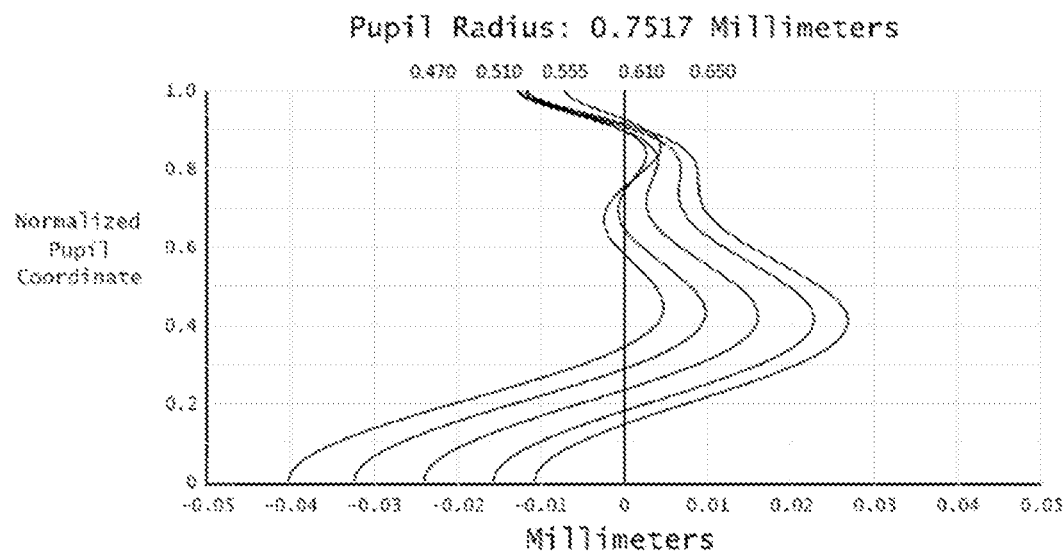
FIG. 9 is a diagram showing longitudinal aberration curves of the optical lens according to the second embodiment of the present disclosure.
Figure 10:
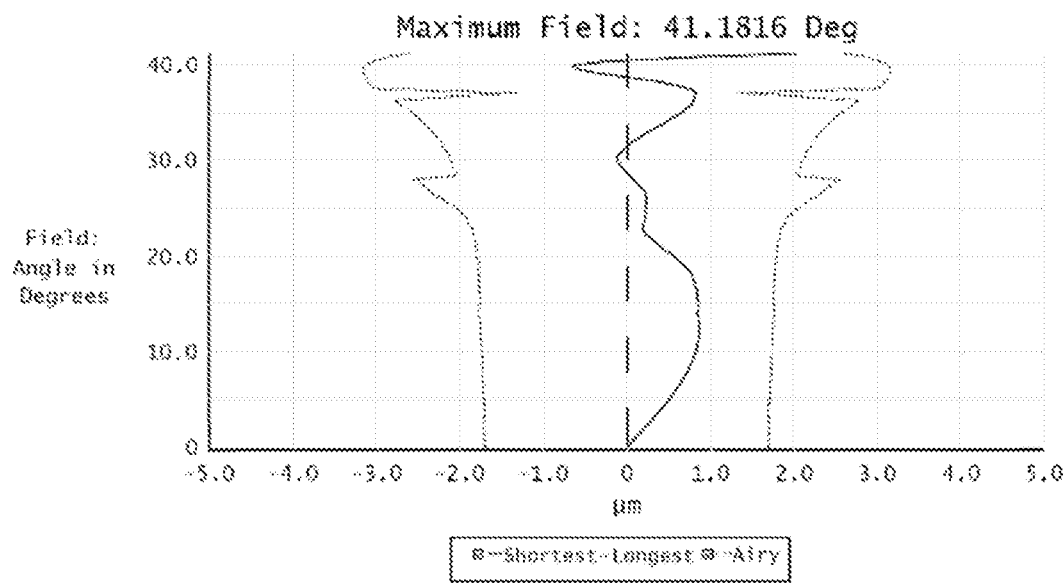
FIG. 10 is a diagram showing lateral chromatic aberration curves of the optical lens according to the second embodiment of the present disclosure

Referring to FIG. 6, a schematic cross-sectional view of an optical lens 200 provided in this embodiment is illustrated. The structure of the optical lens 200 in this embodiment may be substantially similar to the structure of the optical lens 100 in the first embodiment, except that the image side surface S2 of the first lens of the optical lens 200 in this embodiment is a convex surface, the object side surface S3 of the second lens is a concave surface, and the selected curvature radiuses and the materials for the lenses in the optical lens 200 are different.

Related parameters of the various lenses of the optical lens 200 provided in this embodiment are shown in Table 3.

TABLE 3

| Surface No. | | Curvature radius (mm) | Thickness (mm) | Refractive index | Abbe number |
|---|---|---|---|---|---|
| | Object plane | — | 350 | | |
| ST | the stop | — | −0.04 | | |
| S1 | the first lens L1 | 1.525599 | 0.86016 | 1.54 | 55.9 |
| S2 | | 12.58695 | 0.029814 | | |
| S3 | the second lens L2 | 13.75024 | 0.214933 | 1.67 | 19.2 |
| S4 | | 3.655783 | 0.240806 | | |
| S5 | the third lens L3 | 4.642287 | 0.329654 | 1.64 | 23.5 |
| S6 | | 4.711238 | 0.331518 | | |
| S7 | the fourth lens L4 | −8.34898 | 0.784346 | 1.54 | 55.9 |
| S8 | | −1.26053 | 0.473649 | | |
| S9 | the fifth lens L5 | −1.3637 | 0.371082 | 1.53 | 55.6 |
| S10 | | 5.533682 | 0.3 | | |
| S11 | the infrared filter | — | 0.21 | 1.51 | 64 |
| S12 | G1 | — | 0.338933 | | |
| | Imaging plane S13 | — | — | | |

The profile coefficients of the various aspheric surfaces of the optical lens 200 of this embodiment are shown in Table 4-1 and Table 4-2.

TABLE 4-1

| Surface No. | K | $A_4$ | $A_6$ | $A_8$ | $A_{10}$ |
|---|---|---|---|---|---|
| S1 | −0.40713 | −0.01544 | 0.129098 | −0.36539 | 0.24211 |
| S2 | −188.733 | −0.14845 | 0.144098 | 0.016345 | −0.91754 |
| S3 | 0 | −0.12963 | 0.482534 | −1.03066 | 0.390991 |
| S4 | 7.019988 | −0.01953 | 0.23263 | −0.41578 | 0.699897 |
| S5 | 0.47501 | −0.17744 | 0.077406 | 0.225143 | −1.40166 |
| S6 | 0 | −0.1652 | 0.141139 | −0.19426 | 0.143606 |
| S7 | 3.072917 | −0.12507 | 0.103008 | −0.07234 | 0.008033 |
| S8 | −0.56986 | 0.052052 | 0.027514 | 0.003029 | −0.00152 |
| S9 | −0.75059 | 0.085556 | −0.00565 | 0.000214 | 6.93E−05 |
| S10 | 2.542262 | −0.05489 | 0.013786 | −0.00327 | 0.000358 |

TABLE 4-2

| Surface No. | $A_{12}$ | $A_{14}$ | $A_{16}$ | $A_{18}$ | $A_{20}$ |
|---|---|---|---|---|---|
| S1 | 1.484939 | −5.77427 | 9.945184 | −8.62706 | 2.99846 |
| S2 | −0.12966 | 3.991556 | 1.86152 | −12.8428 | 8.210556 |
| S3 | 1.271013 | 0.465357 | −2.30873 | 0.258062 | 0.69229 |
| S4 | −1.23393 | 0.235559 | 5.405667 | −9.6722 | 5.230547 |
| S5 | 2.85991 | −1.88266 | −2.19768 | 4.20485 | −1.9484 |

TABLE 4-2-continued

| Surface No. | $A_{12}$ | $A_{14}$ | $A_{16}$ | $A_{18}$ | $A_{20}$ |
|---|---|---|---|---|---|
| S6 | −0.05893 | 0.100532 | −0.15161 | 0.098592 | −0.02364 |
| S7 | −0.00936 | 0.013568 | 0.008022 | −0.00887 | 0.001696 |
| S8 | 6E−05 | −0.0004 | −6.8E−05 | 0.000123 | −2.1E−05 |
| S9 | −8.7E−06 | −9.7E−07 | 4.54E−07 | −4.5E−08 | 1.91E−09 |
| S10 | −5E−06 | −2.6E−06 | −3.1E−07 | 1.43E−07 | −1E−08 |

In this embodiment, the field curvature curves, distortion curves, longitudinal aberration curves, and lateral chromatic aberration curves of the optical lens 200 are respectively shown in FIG. 7, FIG. 8, FIG. 9 and FIG. 10. As can be seen from FIG. 7 to FIG. 10, the field curvature, the distortion and the chromatic aberration of the optical lens 200 can be well corrected in this embodiment.

Embodiment 3

Figure 11:
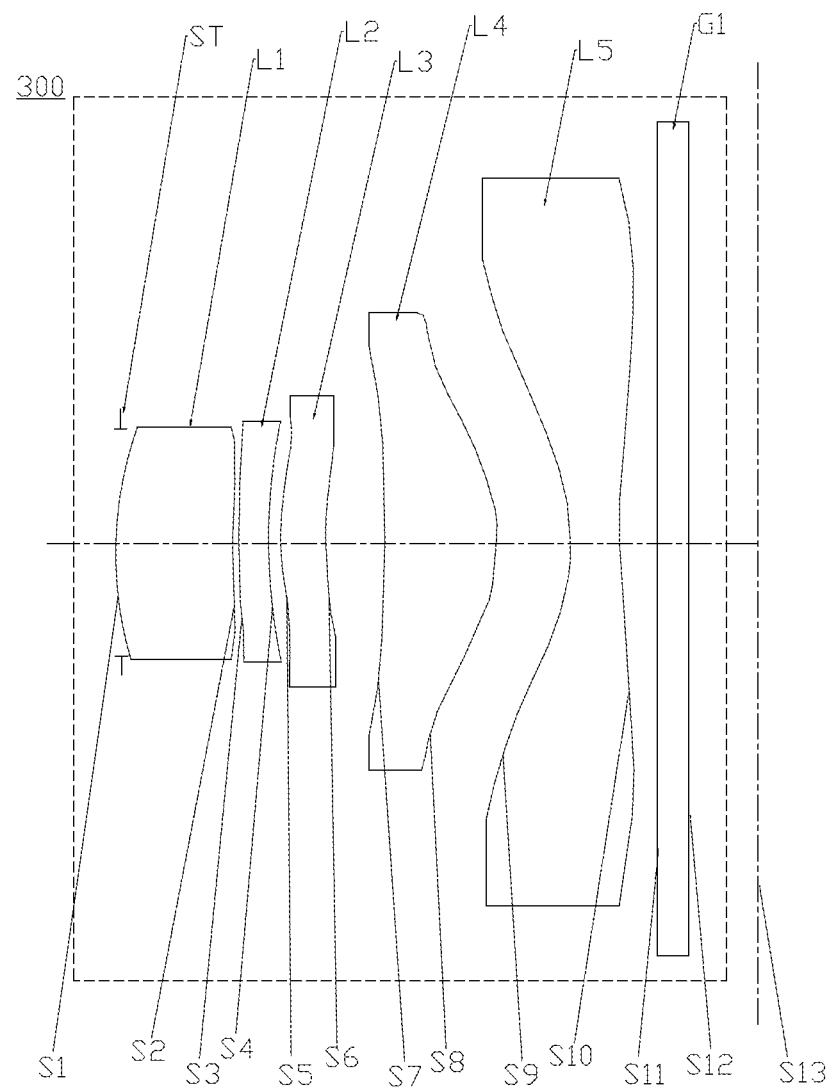
FIG. 11 is a schematic cross-sectional view of an optical lens according to a third embodiment of the present disclosure.
Figure 12:
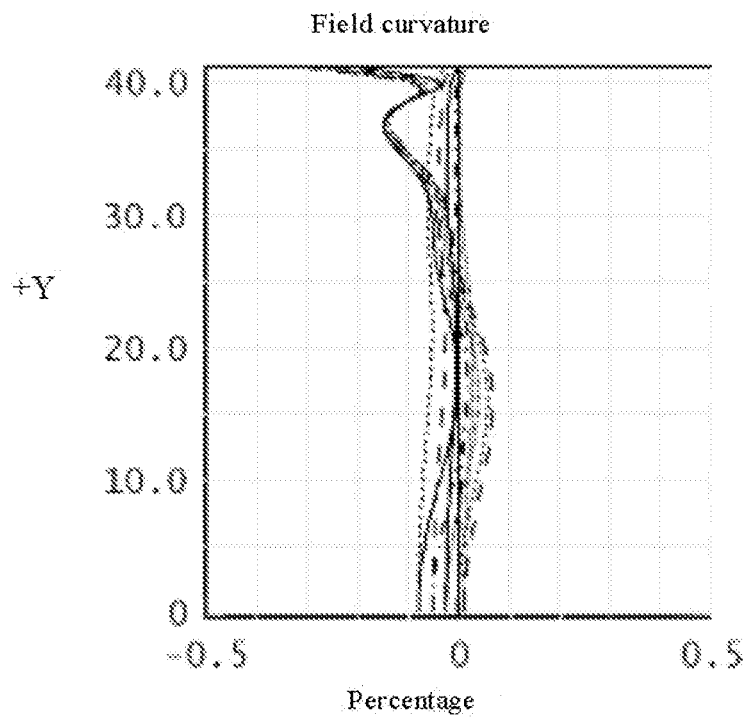
FIG. 12 is a diagram showing field curvature curves of the optical lens according to the third embodiment of the present disclosure.
Figure 13:
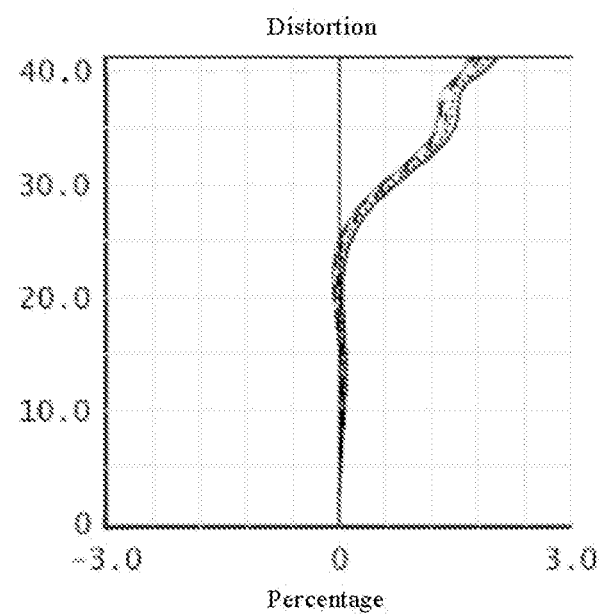
FIG. 13 is a diagram showing distortion curves of the optical lens according to the third embodiment of the present disclosure.
Figure 14:
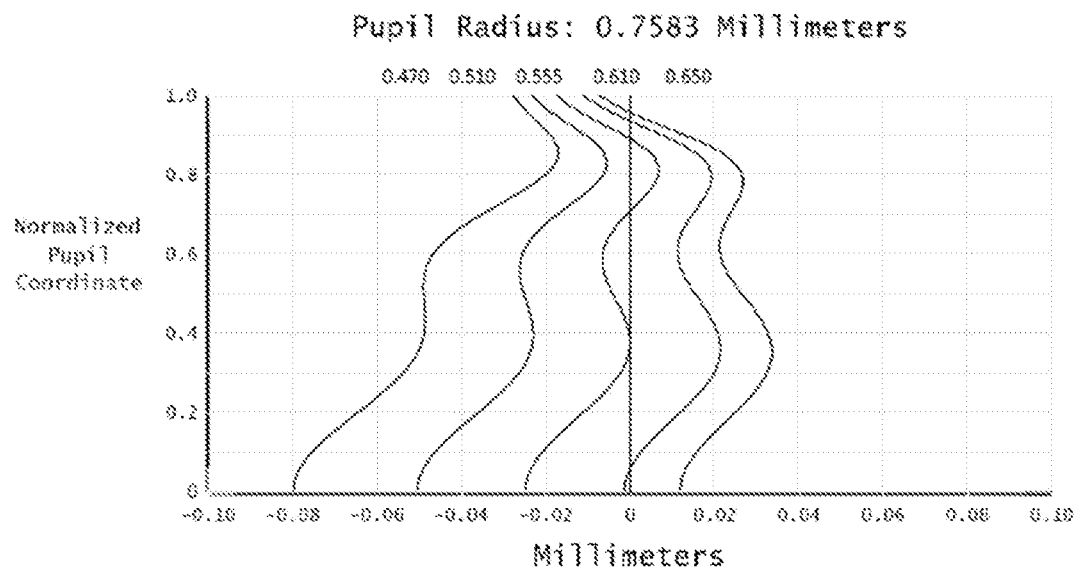
FIG. 14 is a diagram showing longitudinal aberration curves of the optical lens according to the third embodiment of the present disclosure.
Figure 15:
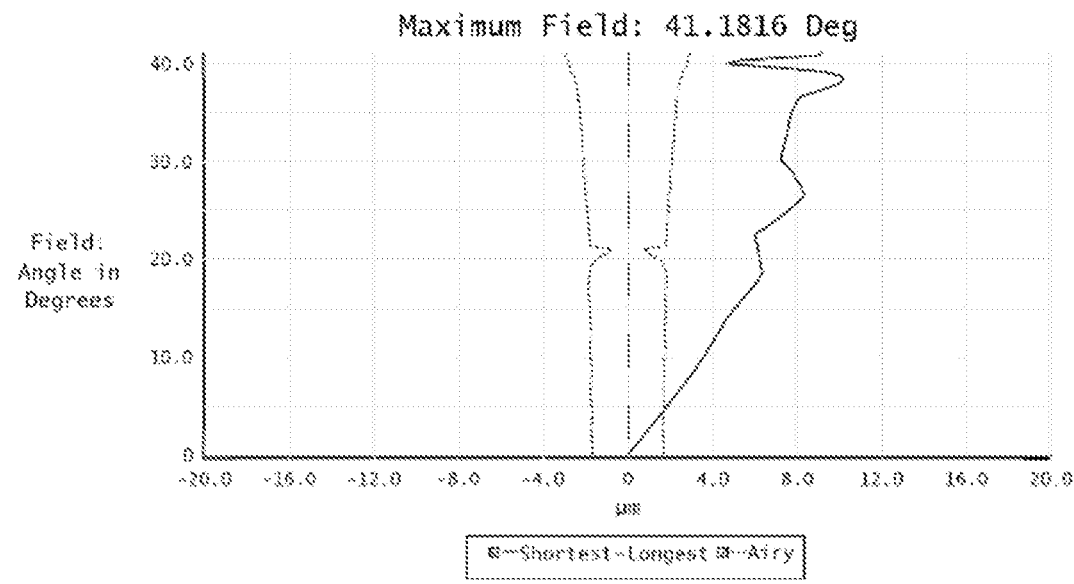
FIG. 15 is a diagram showing lateral chromatic aberration curves of the optical lens according to the third embodiment of the present disclosure.

Referring to FIG. 11, a schematic cross-sectional view of an optical lens 300 provided in this embodiment is illustrated. The structure of the optical lens 300 in this embodiment may be substantially similar to the optical lens 100 in the first embodiment, except that the selected curvature radiuses and the materials for the lenses of the optical lens 300 are different.

Related parameters of the various lenses of the optical lens 300 provided in this embodiment are shown in Table 5.

TABLE 5

| Surface No. | | Curvature radius (mm) | Thickness (mm) | Refractive index | Abbe number |
|---|---|---|---|---|---|
| | Object plane | — | 350 | | |
| ST | the stop | — | −0.04 | | |
| S1 | the first lens L1 | 2.069155 | 0.029945 | 1.54 | 55.9 |
| S2 | | 3.606395 | 0.214987 | | |
| S3 | the second lens L2 | 3.555875 | 0.151575 | 1.67 | 19.2 |
| S4 | | 3.43555 | 0.320895 | | |
| S5 | the third lens L3 | 2.551964 | 0.424207 | 1.64 | 23.5 |
| S6 | | 3.273621 | 0.815069 | | |
| S7 | the fourth lens L4 | −23.439 | 0.577026 | 1.54 | 55.9 |
| S8 | | −1.28939 | 0.359843 | | |
| S9 | the fifth lens L5 | −1.42647 | 0.3 | 1.53 | 55.6 |
| S10 | | 5.149301 | 0.21 | | |
| S11 | the infrared filter | — | 0.53411 | 1.51 | 64 |
| S12 | G1 | — | 0.86016 | | |
| | Imaging plane S13 | — | | | |

The profile coefficients of the various aspheric surfaces of the optical lens 300 of his embodiment are shown in Table 6-1 and Table 6-2.

TABLE 6-1

| Surface No. | K | $A_4$ | $A_6$ | $A_8$ | $A_{10}$ |
|---|---|---|---|---|---|
| S1 | −0.63182 | −0.03001 | 0.100047 | −0.36027 | 0.271894 |
| S2 | −41.3126 | −0.17135 | 0.033739 | 0.005274 | −0.81596 |
| S3 | 0 | −0.16276 | 0.439832 | −1.10246 | 0.35572 |
| S4 | 5.996281 | −0.04452 | 0.247835 | −0.45171 | 0.570975 |
| S5 | −2.94706 | −0.19012 | 0.102352 | 0.231254 | −1.43117 |
| S6 | 0 | −0.1504 | 0.119549 | −0.19579 | 0.147303 |
| S7 | −301.851 | −0.0917 | 0.116345 | −0.06897 | 0.007549 |
| S8 | −0.55446 | 0.054684 | 0.028528 | 0.004 | −0.00127 |
| S9 | −0.74639 | 0.079575 | −0.00541 | 0.00031 | 8.8E−05 |
| S10 | 2.758012 | −0.04846 | 0.014175 | −0.00322 | 0.000361 |

TABLE 6-2

| Surface No. | $A_{12}$ | $A_{14}$ | $A_{16}$ | $A_{18}$ | $A_{20}$ |
|---|---|---|---|---|---|
| S1 | 1.522021 | −5.83458 | 9.853537 | −8.72833 | 3.292438 |
| S2 | −0.09162 | 3.864177 | 1.595596 | −13.3432 | 9.532291 |
| S3 | 1.266839 | 0.508362 | −2.38672 | −0.05036 | 1.338827 |
| S4 | −1.3474 | 0.318781 | 5.695779 | −9.63255 | 4.755165 |
| S5 | 2.856035 | −1.85548 | −2.18037 | 4.199156 | −1.96339 |
| S6 | −0.05426 | 0.101007 | −0.15028 | 0.105608 | −0.0294 |
| S7 | −0.01106 | 0.01243 | 0.007633 | −0.00883 | 0.001845 |
| S8 | 7.03E−05 | −0.00041 | −7.2E−05 | 0.000119 | −2.5E−05 |
| S9 | −7.6E−06 | −1.6E−06 | 1.46E−07 | −1.4E−07 | −2.1E−08 |
| S10 | −5E−06 | −2.7E−06 | −3.3E−07 | 1.4E−07 | −1.1E−08 |

In this embodiment, the field curvature curves, distortion curves, longitudinal aberration curves, and lateral chromatic aberration curves of the optical lens 300 are respectively shown in FIG. 12, FIG. 13, FIG. 14 and FIG. 15. As can be seen from FIG. 12 to FIG. 15, the field curvature, the distortion and the chromatic aberration of the optical lens 300 can be well corrected in this embodiment.

Embodiment 4

Figure 16:
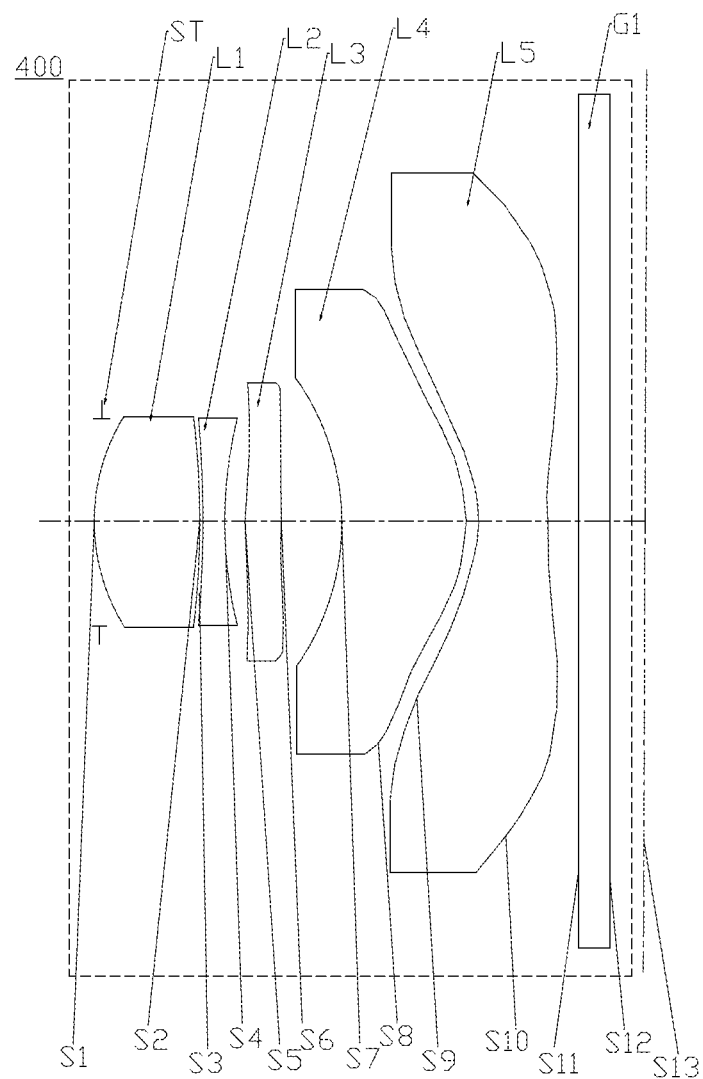
FIG. 16 is a schematic cross-sectional view of an optical lens according to a fourth embodiment of the present disclosure.
Figure 17:
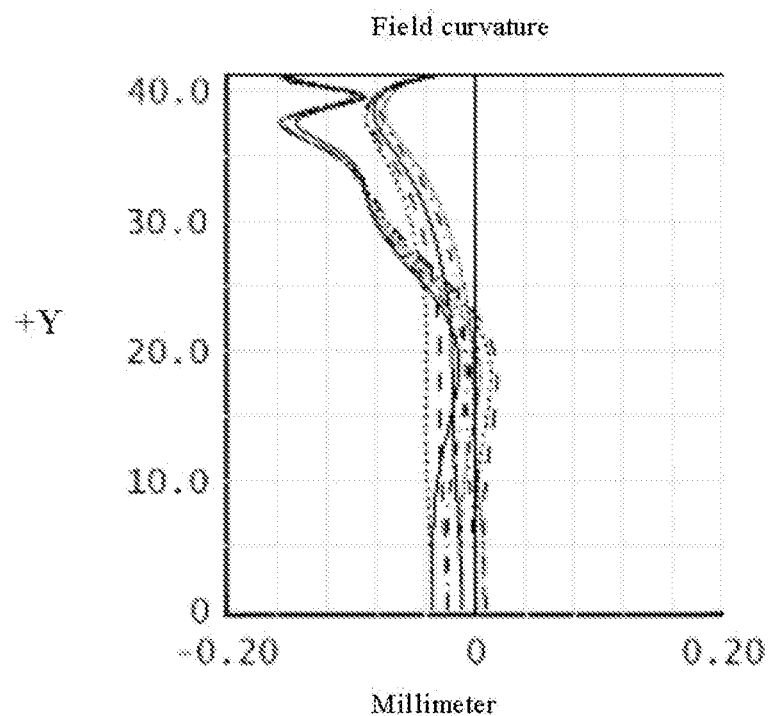
FIG. 17 is a diagram showing field curvature curves of the optical lens according to the fourth embodiment of the present disclosure.
Figure 18:
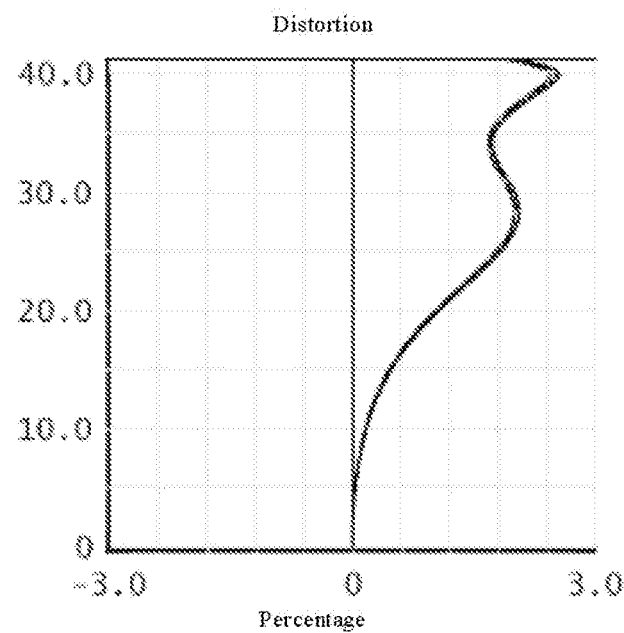
FIG. 18 is a diagram showing distortion curves of the optical lens according to the fourth embodiment of the present disclosure.
Figure 19:
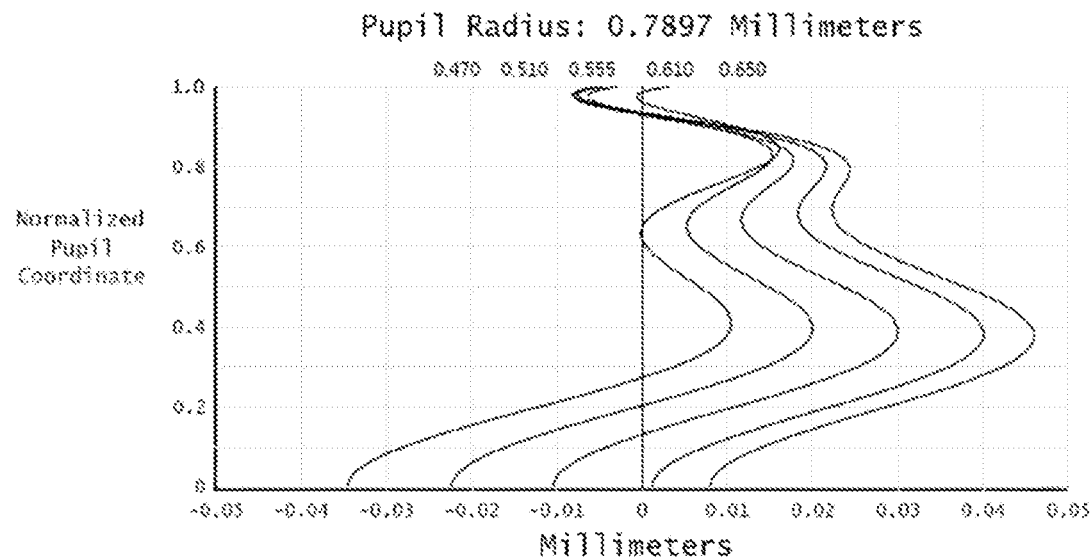
FIG. 19 is a diagram showing longitudinal aberration curves of the optical lens according to the fourth embodiment of the present disclosure.
Figure 20:
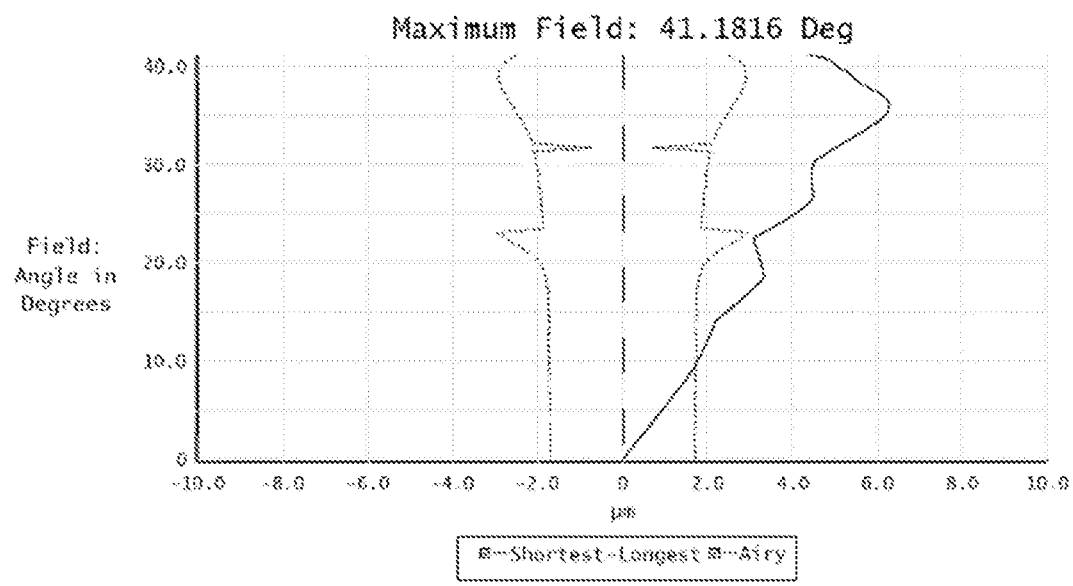
FIG. 20 is a diagram showing lateral chromatic aberration curves of the optical lens according to the fourth embodiment of the present disclosure.

Referring to FIG. 16, a schematic cross-sectional view of an optical lens 400 provided in this embodiment is illustrated. The structure of the optical lens 400 in this embodiment may be substantially similar to the optical lens 100 in the first embodiment, except that the image side surface S2 of the first lens of the optical lens 400 in this embodiment is a convex surface, the object side surface S3 of the second lens is a concave surface, and the selected curvature radiuses and the materials for the lenses are different.

Related parameters of the various lenses of the optical lens 400 provided in this embodiment are shown in Table 7.

TABLE 7

| Surface No. | | Curvature radius (mm) | Thickness (mm) | Refractive index | Abbe number |
|---|---|---|---|---|---|
| | Object plane | — | 350 | | |
| ST | the stop | — | −0.04 | | |
| S1 | the first lens L1 | 1.451061 | 0.86016 | 1.54 | 55.9 |
| S2 | | 11.89529 | 0.029763 | | |
| S3 | the second lens L2 | −54.6335 | 0.214923 | 1.67 | 19.2 |
| S4 | | 4.920069 | 0.162688 | | |
| S5 | the third lens L3 | 5.388745 | 0.300519 | 1.64 | 23.5 |
| S6 | | 57.45834 | 0.369969 | | |
| S7 | the fourth lens L4 | −3.71115 | 1.014011 | 1.54 | 55.9 |
| S8 | | −1.26168 | 0.252093 | | |
| S9 | the fifth lens L5 | −1.32675 | 0.53745 | 1.53 | 55.6 |
| S10 | | 4.887461 | 0.3 | | |
| S11 | the infrared filter | — | 0.21 | 1.51 | 64 |
| S12 | G1 | — | 0.338933 | | |
| | Imaging plane S13 | — | | | |

The profile coefficients of the various aspheric surfaces of the optical lens 400 of this embodiment are shown in Table 8-1 and Table 8-2.

TABLE 8-1

| Surface No. | K | $A_4$ | $A_6$ | $A_8$ | $A_{10}$ |
|---|---|---|---|---|---|
| S1 | −0.33977 | −0.37486 | 0.234352 | 1.488403 | −5.77027 |
| S2 | −296.264 | −0.00115 | −0.95744 | −0.14461 | 4.112522 |
| S3 | 0 | −1.0459 | 0.389174 | 1.313046 | 0.541677 |
| S4 | 12.29556 | −0.37019 | 0.710017 | −1.28777 | 0.263713 |

TABLE 8-1-continued

| Surface No. | K | $A_4$ | $A_6$ | $A_8$ | $A_{10}$ |
|---|---|---|---|---|---|
| S5 | 14.35936 | 0.231796 | −1.40035 | 2.875745 | −1.86729 |
| S6 | 0 | −0.17123 | 0.165534 | −0.04579 | 0.10214 |
| S7 | 10.02503 | −0.04272 | 0.027205 | −0.00777 | 0.007151 |
| S8 | −0.60126 | 0.001926 | −0.00145 | 0.000117 | −0.00039 |
| S9 | −0.73437 | 0.000302 | 8.73E−05 | −6.1E−06 | −8.3E−07 |
| S10 | 1.726209 | −0.00321 | 0.000359 | −5.6E−06 | −2.6E−06 |

TABLE 8-2

| Surface No. | $A_{12}$ | $A_{14}$ | $A_{16}$ | $A_{15}$ | $A_{20}$ |
|---|---|---|---|---|---|
| S1 | 9.930254 | −8.65936 | 3.033959 | −0.37486 | 0.234352 |
| S2 | 1.985673 | −13.3702 | 8.50504 | −0.00115 | −0.95744 |
| S3 | −2.37574 | −0.0616 | 0.890675 | −1.0459 | 0.389174 |
| S4 | 5.554211 | −9.70324 | 5.159746 | −0.37019 | 0.710017 |
| S5 | −2.19711 | 4.198312 | −1.94135 | 0.231796 | −1.40035 |
| S6 | −0.15634 | 0.091096 | −0.03659 | −0.17123 | 0.165534 |
| S7 | 0.00623 | −0.00757 | 0.006317 | −0.04272 | 0.027205 |
| S8 | −6.4E−05 | 0.000123 | −2.2E−05 | 0.001926 | −0.00145 |
| S9 | 4.42E−07 | −5.4E−08 | −5.1E−09 | 0.000302 | 8.73E−05 |
| S10 | −3.1E−07 | 1.43E−07 | −1E−08 | −0.00321 | 0.000359 |

In this embodiment, the field curvature curves, distortion curves, longitudinal aberration curves, and lateral chromatic aberration curves of the optical lens 400 are respectively shown in FIG. 17, FIG. 18, FIG. 19 and FIG. 20. As can be seen from FIG. 17 to FIG. 20, the field curvature, the distortion and the chromatic aberration of the optical lens 400 can be well corrected in this embodiment.

Table 9 shows optical characteristics corresponding to the above four embodiments, mainly including the focal length f of the system, the aperture number F# of the system, the total optical length TTL of the system, the field of view 2θ of the system, and values corresponding to terms in the various expressions mentioned above. In Table 9, it can be seen that the maximum of the total optical length TTL of the system is 4.82 mm, so that the volume of the optical lens is effectively smaller, which can better meet the development trend of portable smart electronic products, such as mobile phones.

TABLE 9

| Embodiment | Embodiment 1 | Embodiment 2 | Embodiment 3 | Embodiment 4 |
|---|---|---|---|---|
| f (mm) | 3.67 | 3.698 | 3.73 | 3.88 |
| F# | 2.45 | 2.45 | 2.45 | 2.45 |
| TTL (mm) | 4.56 | 4.51 | 4.82 | 4.62 |
| 2θ | 82.2° | 82.2° | 82.2° | 82.2° |
| EPD (mm) | 1.494 | 1.5 | 1.51 | 1.579 |
| TC1/ET1 | 1.273 | 1.3577 | 1.198 | 1.5 |
| TC1/DM1 | 0.546 | 0.543 | 0.537 | 0.51 |
| f1/f | 0.951 | 0.837 | 2 | 0.75 |
| f123/f | 1.1724 | 1.154 | 1.386 | 0.84 |
| SAG11-SAG12 | 0.184 | 0.226 | 0.142 | 0.28 |
| V1/(V2-V3) | −13 | −13 | −13 | −13 |
| R31/R32 | 0.8856 | 0.9853 | 0.779 | 0.093 |
| R31/DM31 | 2.3 | 2.0 | 1.23 | 2.4 |
| R11/R12 | 0.19 | 0.12 | 0.573 | 0.12 |

In summary, the optical lenses provided in the embodiments may provide at least advantages as follows:

(1) The common optical lens on the market, which are used in the mobile phones, generally has a minimum head outer diameter of ø3 mm. In contrast, due to the reasonable arrangement of the stop and the various lenses, the optical lens provided by the embodiments of the present disclosure may have a small entrance pupil diameter, and the head outer diameter of the optical lens may be reduced to ø2 mm, satisfying the demand for a high screen-to-body ratio, and better satisfying the needs of the full screen of the mobile phones.

(2) The optical lens provided by the embodiments of the present disclosure adopts five lenses with a specific refractive power, and specific surface shapes and arrangement thereof are adopted for the lenses; as such, a more compact structure of the optical lens is obtained while satisfying a wild angle of view, thereby, achieving compromise between miniaturization and the wild angle of view of the optical lens can be better realized.

(3) A photographic field of a larger area can be obtained, which brings great convenience to the post-editing. In addition, the optical lens of such design enables the sense of depth and space for the imaged picture to be improved, providing better imaging quality.

The optical lenses provided in the various embodiments mentioned above may be applied to terminals, such as mobile phones, tablets, and cameras.

Embodiment 5

Figure 21:
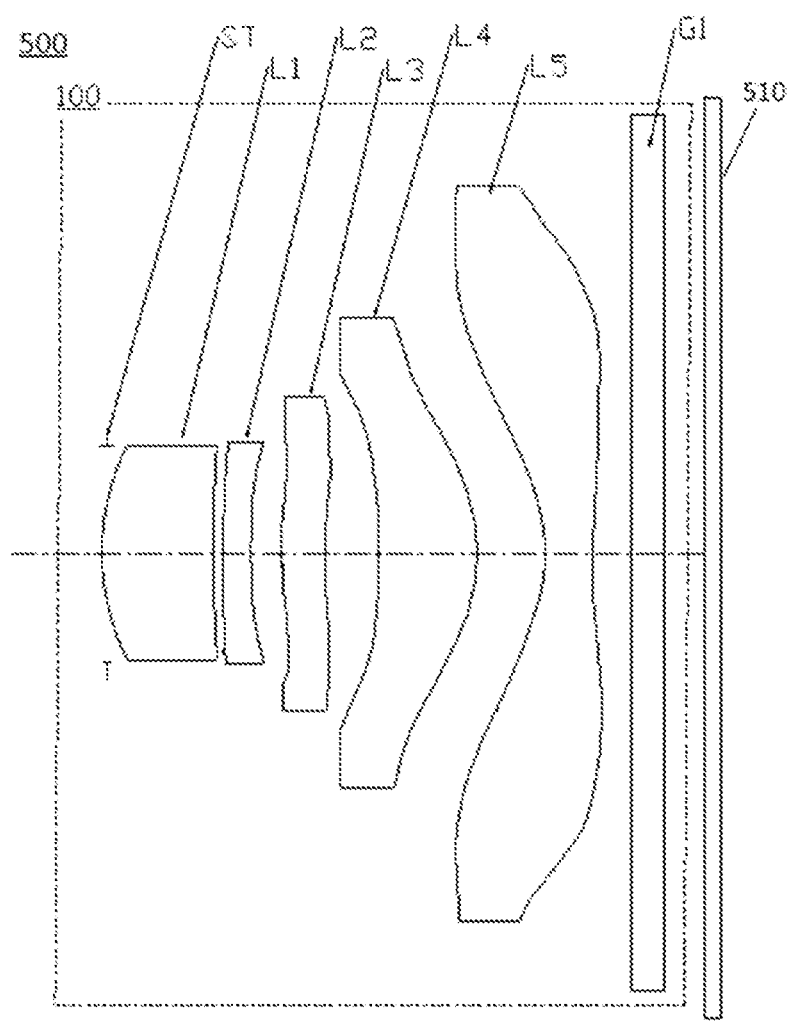
FIG. 21 is a schematic structural diagram of an imaging device according to a fifth embodiment of the present disclosure.

Referring to FIG. 21, a fifth embodiment of the present disclosure further provides an imaging device 500. The imaging device 500 may include an imaging element 510 and the optical lens as shown in any one of the above embodiments (for example, the optical lens 100). The imaging element 510 may be a Complementary Metal Oxide Semiconductor (CMOS) image sensor or a Charge Coupled Device (CCD) image sensor.

The imaging device 500 may be a smart phone, a Pad, or any other type of portable electronic device equipped with the optical lens 100.

Embodiment 6

Figure 22:
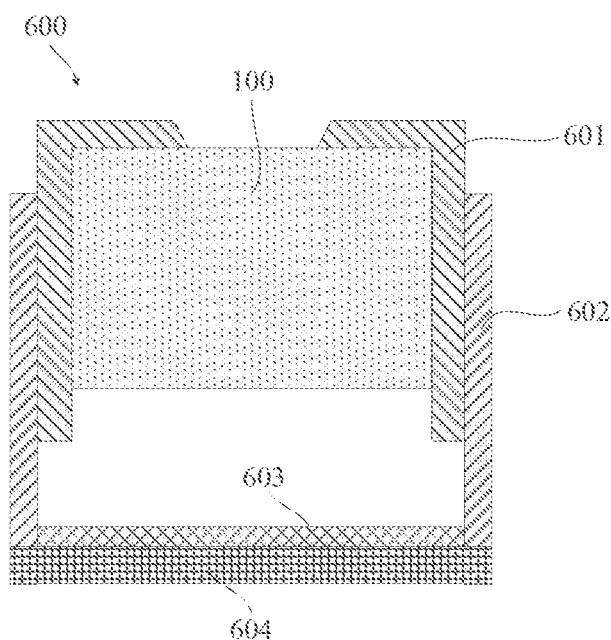
FIG. 22 is a schematic structural diagram showing a cross-section of a camera module according to a sixth embodiment of the disclosure.

Referring to FIG. 22, a sixth embodiment of the present disclosure further provides a camera module 600. The camera module 600 may include the optical lens as shown in any one of the above embodiments (for example, the optical lens 100), a barrel 601, a holder 602, an image sensor 603, and a printed circuit board 604. The optical lens 100 is received in the barrel 601, and the barrel 601 is engaged with the holder 602. The image sensor 603 and the printed circuit board 604 are substantially accommodated in the holder 602. The image sensor 603 is opposite to the optical lens 100 and is mounted on the printed circuit board 604. The image sensor 603 is configured for converting light signals into electrical signals, thereby the images formed by the optical lens 100 can be converted and transmitted to a processor. The printed circuit board 604 can be further electrically connected to a chip or the processor via a flexible circuit board.

Embodiment 7

Figure 23:
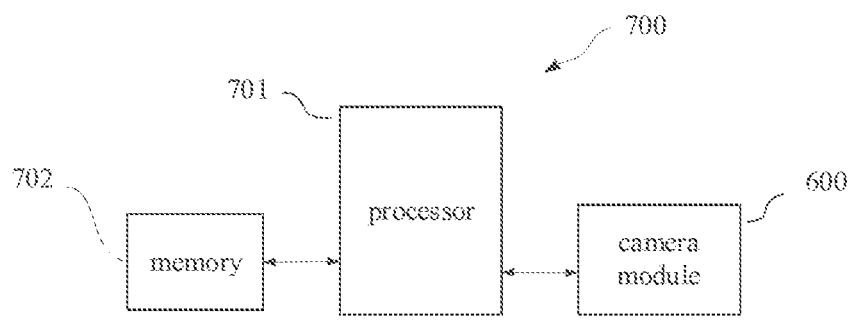
FIG. 23 is a schematic block diagram of a front camera according to a seventh embodiment of the disclosure.
Figure 24:
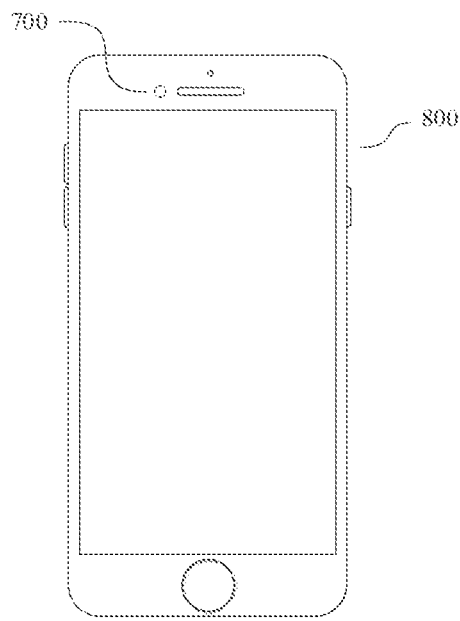
FIG. 24 is a schematic diagram of the front camera according to the seventh embodiment of the disclosure.

Referring to FIG. 23 and FIG. 24, a front camera 700 is mounted on a smart phone 800. The front camera 700 includes the camera module 600 as mentioned above, a processor 701, and a memory 702. The camera module 600 is configured to capture images, the processor 701 is configured to process the captured images, and the memory 702 is configured to store the captured images. The processor 701 is communicated with the camera module 600 and the memory 702. That is, the electrical signals of the images can be transmitted to the processor 701 and stored in the memory 702. The front camera 700 can be applied to a video call system, which is convenient for users to shoot a video and decreases the area of notch in the mobile phones with a full screen.

The above-mentioned embodiments are merely illustrative of several embodiments of the present disclosure, and the specific and detailed description thereof should not to be construed as limiting the scope of the disclosure. It should be noted that various variations and modifications may be made by those skilled in the art without departing from the spirit and scope of the disclosure. The scope of the disclosure should be determined by the appended claims.

What is claimed is:

1. An optical lens, from an object side to an imaging plane along an optical axis, the optical lens sequentially comprising:
    a stop;
    a first lens with a positive focal power, an object side surface of the first lens being convex;
    a second lens with a negative focal power, an image side surface of the second lens being concave;
    a third lens with a positive focal power, an object side surface of the third lens being convex and an image side surface of the third lens being concave;
    a fourth lens with a positive focal power, an object side surface of the fourth lens being concave and an image side surface of the fourth lens being convex; and
    a fifth lens with a negative focal power, a paraxial region of an object side surface of the fifth lens being concave, a paraxial region of an image side surface of the fifth lens being concave;
    wherein an entrance pupil diameter EPD of the optical lens is smaller than 1.58 mm, and a distance between the orthogonal projection of an entrance pupil on the optical axis and the orthogonal projection of an edge of an effective optical portion of the object side surface of the first lens on the optical axis is greater than 0.17 mm.

2. The optical lens as claimed in claim 1, wherein the optical lens meets an expression:

$$1.1 < TC1/ET1 < 1.6;$$

where TC1 represents a center thickness of the first lens, and ET1 represents an edge thickness of the first lens.

3. The optical lens as claimed in claim 1, wherein the optical lens meets an expression:

$$0.5 < TC1/DM1 < 0.6;$$

where TC1 represents a center thickness of the first lens, and DM1 represents a diameter of the first lens.

4. The optical lens as claimed in claim 1, wherein the optical lens meets an expression:

$$0.7 < f1/f < 2.1;$$

where f1 represents an effective focal length of the first lens, and f represents an effective focal length of the optical lens.

5. The optical lens as claimed in claim 1, wherein the optical lens meets an expression:

$$0.8 < f123/f < 1.4;$$

where f123 represents an effective focal length from the first lens to the third lens, and f represents an effective focal length of the optical lens.

6. The optical lens as claimed in claim 1, wherein the optical lens meets an expression:

$$0.1 \text{ mm} < SAG11 - SAG12 < 0.3 \text{ mm};$$

where SAG11 represents a vector height of the object side surface of the first lens, and SAG12 represents a vector height of the image side surface of the first lens.

7. The optical lens as claimed in claim 1, wherein the optical lens meets an expression:

$$V1/(V2-V3) < -10;$$

$$V2 = 23.52;$$

where V1 represents an Abbe number of the first lens, V2 represents an Abbe number of the second lens, and V3 represents an Abbe number of the third lens.

8. The optical lens as claimed in claim 1, wherein the optical lens meets an expression:

$$0 < R31/R32 < 1;$$

where R31 represents a curvature radius of the object side surface of the third lens, and R32 represents a curvature radius of the image side surface of the third lens.

9. The optical lens as claimed in claim 1, wherein the optical lens satisfies an expression as follows:

$$1.2 < R31/DM31 < 2.6;$$

where R31 represents a curvature radius of the object side surface of the third lens, and DM31 represents a diameter of the object side surface of the third lens.

10. The optical lens as claimed in claim 1, wherein the optical lens meets an expression:

$$0.1 < R11/R12 < 0.6;$$

where R11 represents a curvature radius of the object side surface of the first lens, and R12 represents a curvature radius of the image side surface of the first lens.

11. The optical lens as claimed in claim 1, wherein the first lens, the second lens, the third lens, the fourth lens and the fifth lens are all plastic aspherical lenses.

12. A camera module, comprising an optical lens and an image sensor opposite to the optical lens, wherein, from an object side to an Imaging plane along an optical axis, the optical lens sequentially comprising:
    a stop;
    a first lens with a positive focal power, an object side surface of the first lens being convex;
    a second lens with a negative focal power, an image side surface of the second lens being concave;
    a third lens with a positive focal power, an object side surface of the third lens being convex and an image side surface of the third lens being concave;
    a fourth lens with a positive focal power, an object side surface of the fourth lens being concave and an image side surface of the fourth lens being convex; and
    a fifth lens with a negative focal power, a paraxial region of an object side surface of the fifth lens being concave, a paraxial region of an image side surface of the fifth lens being concave;
    wherein an entrance pupil diameter EPD of the optical lens is smaller than 1.58 mm, and a distance between the orthogonal projection of an entrance pupil on the optical axis and the orthogonal projection of an edge of an effective optical portion of the object side surface of the first lens on the optical axis is greater than 0.17 mm.

13. The camera module as claimed in claim 12, wherein the first lens meets expressions:

$$1.1 < TC1/ET1 < 1.6;$$

$$0.5 < TC1/DM1 < 0.6;$$

$0.1 < SAG11 - SAG12 < 0.3;$ $0.1 < R11/R12 < 0.6;$ where TC1 represents a center thickness of the first lens, ET1 represents an edge thickness of the first lens, DM1 represents a diameter of the first lens, SAG11 represents a vector height of the object side surface of the first lens, SAG12 represents a vector height of the image side surface of the first lens, R11 represents a curvature radius of the object side surface of the first lens, and R12 represents a curvature radius of the image side surface of the first lens.

14. The camera module as claimed in claim 12, wherein the third lens meets expressions:

$0 < R31/R32 < 1;$ and $1.2 < R31/DM31 < 2.6;$ where R31 represents a curvature radius of the object side surface of the third lens, R32 represents a curvature radius of the image side surface of the third lens, and DM31 represents a diameter of the object side surface of the third lens.

15. The camera module as claimed in claim 12, wherein the optical lens meets expressions:

$0.7 < f1/f < 2.1;$ $0.8 < f123/f < 1.4;$ and $V1/(V2 - V3) < -10, V2 = 23.52;$ where f1 represents an effective focal length of the first lens, f represents an effective focal length of the optical lens, f123 represents an effective focal length from the first lens to the third lens.

16. The camera module as claimed in claim 12, wherein the optical lens meets expressions:

$V1/(V2 - V3) < -10, V2 = 23.52;$

Where V1 represents an Abbe number of the first lens, V2 represents an Abbe number of the second lens, and V3 represents an Abbe number of the third lens.

17. The camera module as claimed in claim 12, wherein the first lens, the second lens, the third lens, the fourth lens and the fifth lens of the optical lens are selected from plastic aspherical lenses and glass lenses.

18. The camera module as claimed in claim 12, wherein the total optical length TTL of the optical lens is smaller than 4.82 mm and greater than 4.56 mm.

19. The camera module as claimed in claim 12, wherein a distance between the first lens and the second lens is smaller than a distance between any two adjacent lenses of the second lens, the third lens, the fourth lens and the fifth lens.

20. A front camera, comprising a camera module, a processor, and a memory, wherein the camera module is configured to capture one or more images, the processor is configured to process the captured images, and the memory is configured to store the images; the camera module comprises an optical lens and an image sensor opposite to the camera lens, from an object side to an imaging plane of the camera lens, the camera lens sequentially comprising:

a stop;
a first lens with a positive focal power, an object side surface of the first lens being convex;
a second lens with a negative focal power, an image side surface of the second lens being concave;
a third lens with a positive focal power, an object side surface of the third lens being convex and an image side surface of the third lens being concave;
a fourth lens with a positive focal power, an object side surface of the fourth lens being concave and an image side surface of the fourth lens being convex; and
a fifth lens with a negative focal power, a paraxial region of an object side surface of the fifth lens being concave, a paraxial region of an image side surface of the fifth lens being concave;
wherein an entrance pupil diameter EPD of the optical lens is smaller than 1.58 mm, and a distance between the orthogonal projection of an entrance pupil on the optical axis and the orthogonal projection of an edge of an effective optical portion of the object side surface of the first lens on the optical axis is greater than 0.17 mm.

* * * * *